United States Patent [19]
Smolansky et al.

[11] Patent Number: 5,673,396
[45] Date of Patent: Sep. 30, 1997

[54] ADJUSTABLE DEPTH/WIDTH FIFO BUFFER FOR VARIABLE WIDTH DATA TRANSFERS

[75] Inventors: Leonid Smolansky, orot; Shai Kowal, ramat-gan; Avner Goren, givat-tal; David Galanti, natania, all of Israel

[73] Assignee: Motorola, Inc., Schaumburg, Ill.

[21] Appl. No.: 357,909

[22] Filed: Dec. 16, 1994

[51] Int. Cl.$^6$ .................................................. G06F 13/00
[52] U.S. Cl. ...................... 395/250; 364/939; 364/254.5; 364/239
[58] Field of Search ...................................... 395/250, 800

[56] References Cited

U.S. PATENT DOCUMENTS

| | | | |
|---|---|---|---|
| 3,924,245 | 12/1975 | Eaton et al. | 395/421.09 |
| 4,258,418 | 3/1981 | Heath | 395/250 |
| 4,447,878 | 5/1984 | Kinnie et al. | 395/307 |
| 4,468,734 | 8/1984 | Lanier | 395/182.02 |
| 4,683,534 | 7/1987 | Tietjen et al. | 364/200 |
| 4,839,791 | 6/1989 | Ito | 395/250 |
| 4,881,167 | 11/1989 | Saskai et al. | 395/411 |
| 4,954,987 | 9/1990 | Auvinen et al. | 365/189.02 |
| 4,965,772 | 10/1990 | Daniel et al. | 395/200.11 |
| 5,155,810 | 10/1992 | McNamara, Jr. et al. | 395/250 |
| 5,262,997 | 11/1993 | Lee | 365/221 |
| 5,426,736 | 6/1995 | Guineau | 395/250 |

Primary Examiner—David Y. Eng
Attorney, Agent, or Firm—Daniel D. Hill

[57] ABSTRACT

An adjustable depth/width FIFO buffer (65) is provided that accommodates variable width data transfers. The FIFO buffer (65) has two sections of read/write registers (73, 75) that are each independently controlled for transferring 16 bit words or 32 bit words without wasting register space in the FIFO buffer (65) when transferring 16 bit words. When the FIFO buffer (65) is narrowed to transfer 16 bit words, the storage space is deepened. This allows maximum use of the FIFO buffer registers (72) when interfacing either 16 bits of parallel data or 32 bits of parallel data. The FIFO buffer (65) is a slave only buffer to a host processor, therefore, the FIFO buffer (65) cannot initiate output of data, keeping the design simple and small.

10 Claims, 5 Drawing Sheets

FIG.4

69 →
BIT NUMBER: 23 | 22 | 21 ... 16 | 15 ... 0
FC1 *130* | FC0 *131* | BL5–BL0 *132* | (empty)

FIG.5

67 →
BIT NUMBER: 31 ... 15 | 14 | 13 | 12 | 11 | 10 | 5 | 4 | 3 | 0
... *135* | HRF1 *136* | HRF0 *137* | (empty) | HTF1 *138* | HTF0 *139* | HF2 *140* | HF1 *141* | HF0 *142* | ...

FIG.6

68 →
BIT NUMBER: 23 | 6 | 5 | 4 | 3 | 2 | 1 | 0
HACT *145* | ... | HF2 *146* | HF1 *147* | HF0 *148* | SRRQ *149* | STRQ *150* | HCP *151*

ADJUSTABLE DEPTH/WIDTH FIFO BUFFER FOR VARIABLE WIDTH DATA TRANSFERS

CROSS REFERENCE TO RELATED APPLICATION

A related application entitled "APPARATUS AND METHOD FOR INSERTING AN ADDRESS WITHIN A DATA STREAM IN A DATA PROCESSING SYSTEM", by Smolansky et al., and having Ser. No. 08/357,898, was filed concurrently herewith, and assigned to the assignee hereof.

FIELD OF THE INVENTION

This invention relates generally to first-in, first-out (FIFO) memories, and more particularly, to an adjustable depth/width FIFO buffer for variable width data transfers.

BACKGROUND OF THE INVENTION

Digital signal processing is the arithmetic processing of read-time signals sampled at regular intervals and digitized. A digital signal processor (DSP) performs digital signal processing functions such as filtering, mixing, and comparison of signals. In some data processing systems, a DSP may be included with a host processor to deal with the digital signal processing chores. A host processor may include, for example, a microcomputer or a microprocessor.

Occasionally it may be necessary for relatively large amounts of data to be transferred between the host processor and the DSP. When data is transferred between the two processors, a direct transfer may not be possible, because of incompatibilities between the two processors, such as, for example, the two processors may operate with different clocks. In this case, an asynchronously operated buffer memory may be used. The data is first transferred in bursts to the buffer memory by the transmitting processor before it can be received by the receiving processor. However, a buffer memory may require a large amount of valuable surface area on an integrated circuit, be expensive to implement, and slow down processing because all of the data must been transferred before the data can be processed.

To eliminate the relatively large buffer memory, a smaller first-in, first-out (FIFO) buffer is sometimes used to interface the host processor with the receiving processor. A FIFO buffer is a memory unit that outputs data in the same order as the data is received. Data may be transferred from a bus in the host processor to the FIFO buffer, and at the same time, the FIFO buffer transfers the data to a bus in the receiving processor. The FIFO buffer is used in place of the buffer memory. The data may consist of many data words transferred as a data stream. Each data word has a certain number of bits. For example, a data word may be 16 bits wide, or may be 32 bits wide. A FIFO buffer supporting the data transfer typically supports the widest data transfer. However, if only 16 bits of data are transferred utilizing a FIFO buffer that is 32 bits wide, only half of the FIFO buffer's storage capacity is utilized.

SUMMARY OF THE INVENTION

Accordingly, there is provided, in one form, a data processing system having a first-in, first-out buffer, the first-in, first-out buffer having a plurality of registers and control logic. Each register of the plurality of registers has a plurality of input terminals coupled to a first bus, and a plurality of output terminals coupled to a second bus. The control logic is coupled to the plurality of registers. The control logic enables one register of the plurality of registers to receive data from the first bus when a data word from the first bus has a first predetermined width. Also, the control logic enables two registers of the plurality of registers when a data word from the first bus has a second predetermined width.

These and other features and advantages will be more clearly understood from the following detailed description taken in conjunction with the accompanying drawings.

BRIEF DESCRIPTION OF THE DRAWINGS

FIG. 4 illustrates in block diagram form, a DSP control register of the host interface of FIG. 2.

FIG. 5 illustrates in block diagram form, a host interface control register of the host interface of FIG. 2.

FIG. 6 illustrates in block diagram form, a DSP status register of the host interface of FIG. 2.

DESCRIPTION OF A PREFERRED EMBODIMENT

Figure 1:
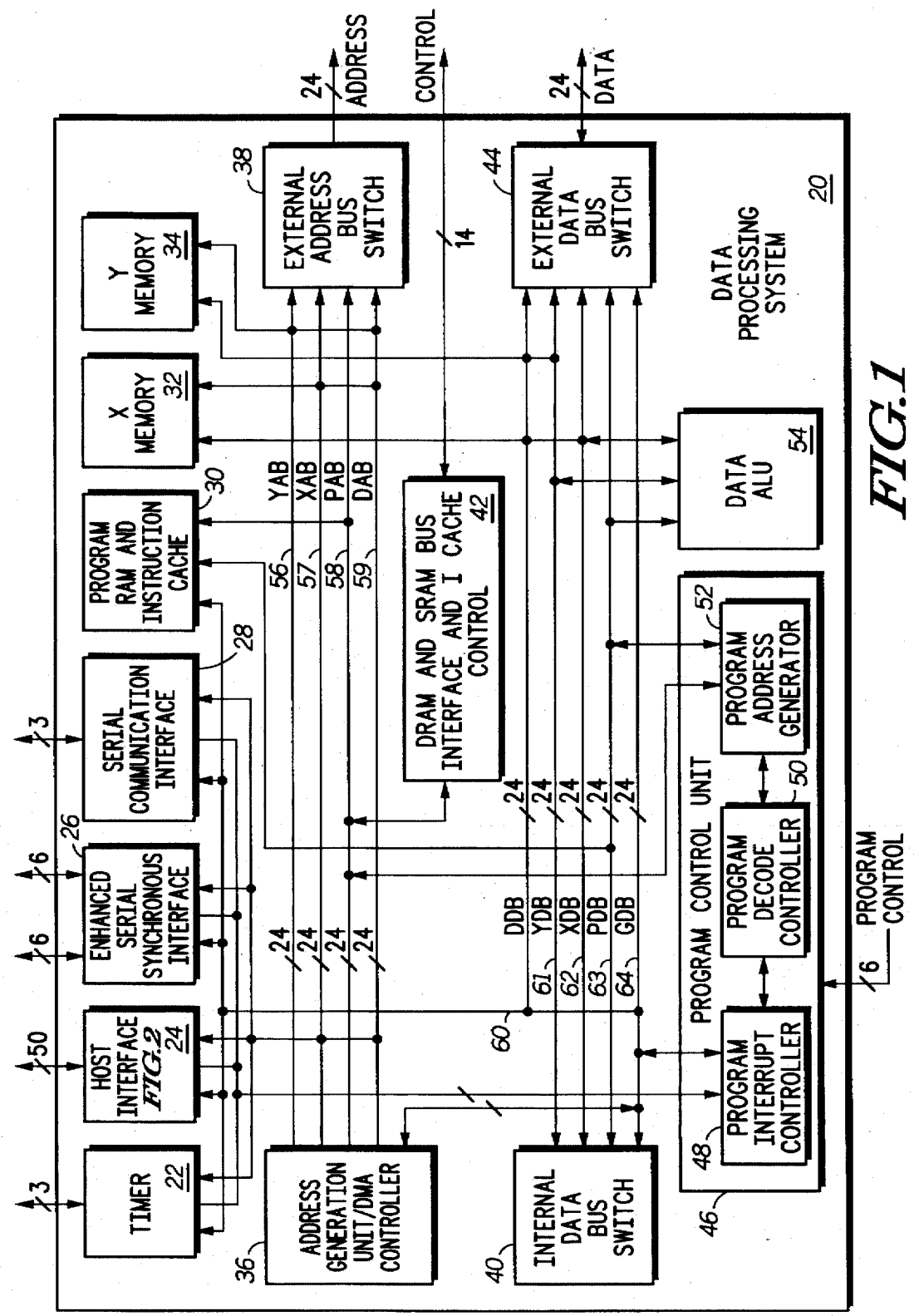
FIG. 1 illustrates in block diagram form, a data processing system in accordance with the present invention.

Generally, the present invention provides an adjustable depth/width FIFO buffer for variable width data transfers. The FIFO buffer has two parts that are each independently controlled to allow either 16 bit words or 32 bit words to be transferred without wasting storage space in the FIFO buffer when 16 bit words are transferred. The FIFO buffer is organized as 32 bits wide and 4 words deep when sampling an external bus that has 32 bit wide words, and is organized as 16 bits wide and 8 words deep when sampling data words that are 16 bits wide. Thus, the storage area is deepened when interfacing an external bus that has words 16 bits wide. In other embodiments, the FIFO buffer can be adapted for use with words having different widths and can have different depths. This allows maximum use of the FIFO buffer storage space when interfacing either 16 bits of parallel data or 32 bits of parallel data. The FIFO buffer is a slave only buffer to a host processor. The FIFO buffer cannot initiate the sampling of data keeping the design simple and small. The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one. The term "bus" will be used to refer to a plurality of signals which may be used to transfer one or more various types of information, such as data, addresses, control, or status.

The present invention can be more fully described with reference to FIGS. 1-8. Each block illustrated in FIGS. 1-7 represents circuitry. Each block illustrated in FIG. 8 represents one or more steps in a flow chart. FIG. 1 illustrates in block diagram form, data processing system 20 in accordance with the present invention. In the embodiment illustrated in FIG. 1, data processing system 20 is a digital signal processor (DSP) and is located on a single integrated circuit. In other embodiments, data processing system 20 may be, for example, a microcomputer or a microprocessor. Data processing system 20 includes timer 22, host interface 24, enhanced serial synchronous interface (ESSI) 26, serial asynchronous interface (SCI) 28, program RAM (random access memory) and instruction cache 30, data memory 32, data memory 34, address generation unit/direct memory access (DMA) controller 36, external address bus switch 38, internal data bus switch 40, DRAM (dynamic random access memory) and SRAM (static random access memory) bus interface and instruction cache control 42, external data bus switch 44, program control unit (PCU) 46, and data arithmetic unit (ALU) 54. Program control unit 46 includes program interrupt controller 48, program decode controller 50, and program address generator 52.

Address bus 56, labeled "YAB", address bus 57, labeled "XAB", program address bus 58, labeled "PAB", and address bus 59, labeled "DAB", are coupled between address generation unit/DMA controller 36 and external address bus switch 38. Data bus 60, labeled "DDB", is coupled between host interface 24 and external data bus switch 44. Data bus 61, labeled "YDB", data bus 62, labeled "XDB", program data bus 63, labeled "PDB", and program data bus 64, labeled "GDB" is coupled between internal data bus switch 40 and external data bus switch 44.

Timer 22 includes three timers that can use internal or external timing, and can interrupt data processing system 20 or signal an external device. In addition, timer 22 can be used to signal a DMA transfer after a specified number of events have occurred. Each of the three timers is coupled to a single bi-directional pin or terminal. In addition, each timer of timer 22 is coupled to bus 57, bus 59, program interrupt controller 48, and to bus 60.

Host interface 24 provides a bi-directional interface for communications between data processing system 20 and another device such as a microcomputer, microprocessor, or DMA. Also, host interface 24 is bi-directionally coupled to external data bus switch 44 via bus 60, bi-directionally coupled to global data bus 64, to program interrupt controller 48, to address generation unit/DMA controller 36, and to external address bus switch 38 via buses 57 and 59. In addition, host interface 24 is bi-directionally coupled to 50 external pins or terminals for bi-directional data transfers, address register selections, and control communications from a host processor.

Enhanced serial synchronous interface (ESSI) 26 is coupled to 12 bi-directional external pins to provide serial communication with external serial devices including, for example, one or more industry standard codecs, DSPs (digital signal processors), or microprocessors. ESSI 26 also has terminals coupled to bus 57, bus 59, and bus 60.

Serial communication interface (SCI) 28 is coupled to 3 bi-directional external pins for providing serial communication with external devices. SCI 28 also has terminals coupled to bus 57, bus 59, and bus 60.

The embodiment of data processing system 20 illustrated in FIG. 1 has three memory spaces: program RAM and instruction cache 30, X memory 32, and Y memory 34. In other embodiments, there may be more or fewer memory spaces. Program RAM and instruction cache 30 is coupled to address bus 58 and to data bus 63. X memory 32 is coupled to address bus 57, address bus 59, data bus 60, and to data bus 62. Y memory 34 is coupled to address bus 56, address bus 59, data bus 60, and to data bus 61.

Address generation unit/DMA controller 36 is coupled to address buses 56, 57, 58, and 59. Address generation unit/DMA controller 36 provides memory addresses to timer 22, host interface 24, ESSI 26, SCI 28, program RAM and instruction cache 30, memory 32, memory 34, external address bus switch 38, and to DRAM and SRAM bus interface and Instruction cache control 42. In a preferred embodiment, the DMA controller has six channels.

DRAM and SRAM bus interface and instruction cache 42 is coupled to program address bus 58 and to 14 bi-directional external pins. The instruction cache of DRAM and SRAM bus interface and instruction cache 42 functions as a buffer memory between external main memory (not shown) and program control unit 46. The instruction cache stores program instructions that are frequently used. An increase in performance may result when instruction words required by a program are available in the cache, because time required for accessing the main memory is eliminated.

Internal data bus switch 40 is coupled to data bus 60, data bus 61, data bus 62, program data bus 63, and to global data bus 64. External data bus switch 44 is coupled to internal data bus switch 40 via data bus 60, data bus 61, data bus 62, program data bus 63, and to global data bus 64. In addition, external data bus switch 44 is coupled to timer 22, host interface 24, ESSI 26, and SCI 28 via data bus 60. Internal data bus switch 40 is used for transfers between buses. Any two buses can be connected together through internal data bus switch 40. External address bus switch 38 and external data bus switch 44 couple external buses (not shown) to any internal address and internal data bus, respectively.

In program control unit 46, program interrupt controller 48 arbitrates among interrupt requests, and is coupled to timer 22, host interface 24, ESSI 26, and SCI 28. Also, program interrupt controller 48 is bi-directionally coupled to global data bus 64 and program decode controller 50. Program decode controller 50 decodes each 24-bit instruction and is bi-directionally coupled to program interrupt controller 48 and to program address generator 52. Program address generator 52 contains all of the hardware needed for program address generation, system stack, and loop control. In addition, program address generator 52 is coupled to program address bus 58 and to program data bus 63.

Data arithmetic logic unit (ALU) 54 is coupled to program data bus 63, data bus 61, and to data bus 62. Data ALU 54 performs all of the arithmetic and logical operations on data operands. ALU 54 contains registers which may be read or written over by way of buses 61 and 62. Data ALU 54 is also coupled to bus 63 and to bus 60.

Clock generator circuits (not shown) provide clock signals to all of the blocks shown in FIG. 1. There is also test circuitry in data processing system 20 that is not shown in FIG. 1.

Figure 2:
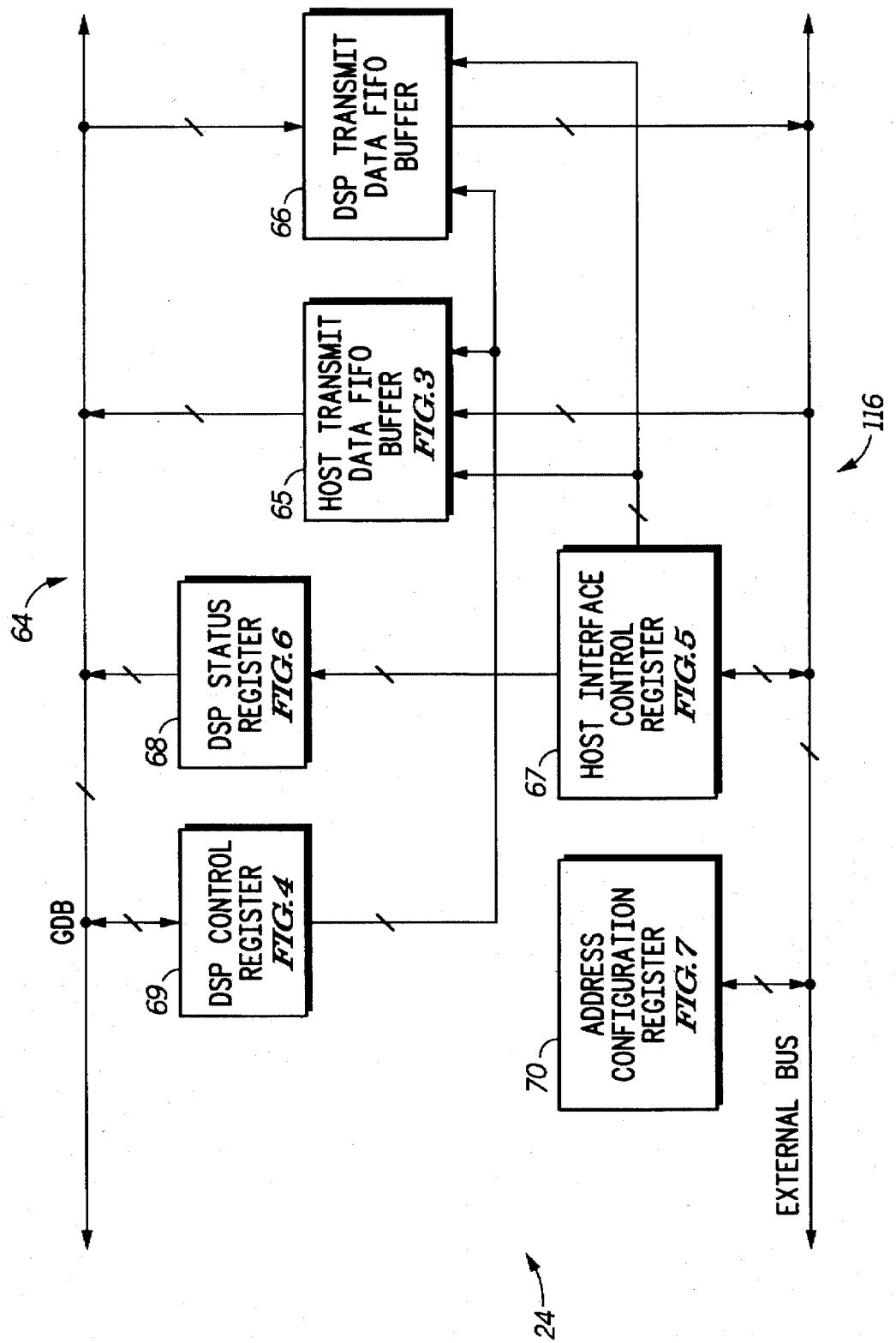
FIG. 2 illustrates in block diagram form, an embodiment of a host interface of the data processing system of FIG. 1.

FIG. 2 illustrates in block diagram form, host interface 24 of data processing system 20 of FIG. 1. Host interface 24 includes host transmit data FIFO buffer 65, DSP transmit data FIFO buffer 66, host interface control register 67, DSP status register 68, DSP control register 69, and address configuration register 70. In the illustrated embodiment, host interface 24 has two FIFO buffers. In other embodiments, host interface 24 may have more or fewer FIFO buffers. Host transmit data FIFO buffer 65 has a plurality of data input terminals coupled to external bus 116, a plurality of data output terminals coupled to global data bus (GDB) 64, a first plurality of control terminals coupled to a plurality of output terminals of host interface control register 67, and a second plurality of control terminals coupled to a plurality of output terminals of DSP control register 69. DSP transmit data FIFO buffer 66 has a plurality of data input terminals coupled to global data bus 64, a plurality of data output terminals coupled to external bus 116, a first plurality of control terminals coupled to a plurality of output terminals of host interface control register 67, and a second plurality of control terminals coupled to a plurality of output terminals of DSP control register 69.

Host interface control register 67 also has a plurality of bi-directional terminals coupled to external bus 116, and a plurality of output terminals coupled to DSP status register 68. DSP status register 68 has a plurality of output terminals coupled to global data bus 64, and DSP control register 69 has a plurality of bi-directional terminals coupled to global data bus 64, and a plurality of output terminals coupled to control terminals of FIFO buffers 65 and 66.

A host processor (not shown) can initiate a transfer of data from bus 116 to a location in data processing system 20 by way of host interface 24 to global data bus 64. External bus 116 and bus 64 are both bi-directional buses. In one embodiment, bus 116 is a multiplexed bus that communicates both data and addresses. In other embodiments, external bus 116 may have separate data and address lines. When a transfer from bus 116 to bus 64 is required, the host processor controls the transfer. FIFO buffer 65 operates as slave only to the host processor. FIFO buffer 65 can be written to by the host processor, but a transfer is not initiated by FIFO buffer 65. Likewise, FIFO buffer 66 is slave only for transmitting data from data processing system 20 to external bus 116.

Host interface control register 67 (FIG. 5) and DSP control register 69 (FIG. 4) provide control bits for defining a transfer of data between bus 116 and bus 64. The host processor also communicates with DSP status register 68 through host interface control register 67 to activate FIFO buffer 65, to determine if FIFO buffers 65 and 66 are empty or full, and for receiving other types of status information as described later in the discussion of FIG. 6. Address configuration register 70 is coupled to bus 116 and includes address bits for programming a base address to define the range of addresses for accessing FIFO buffer 65.

Figure 3:
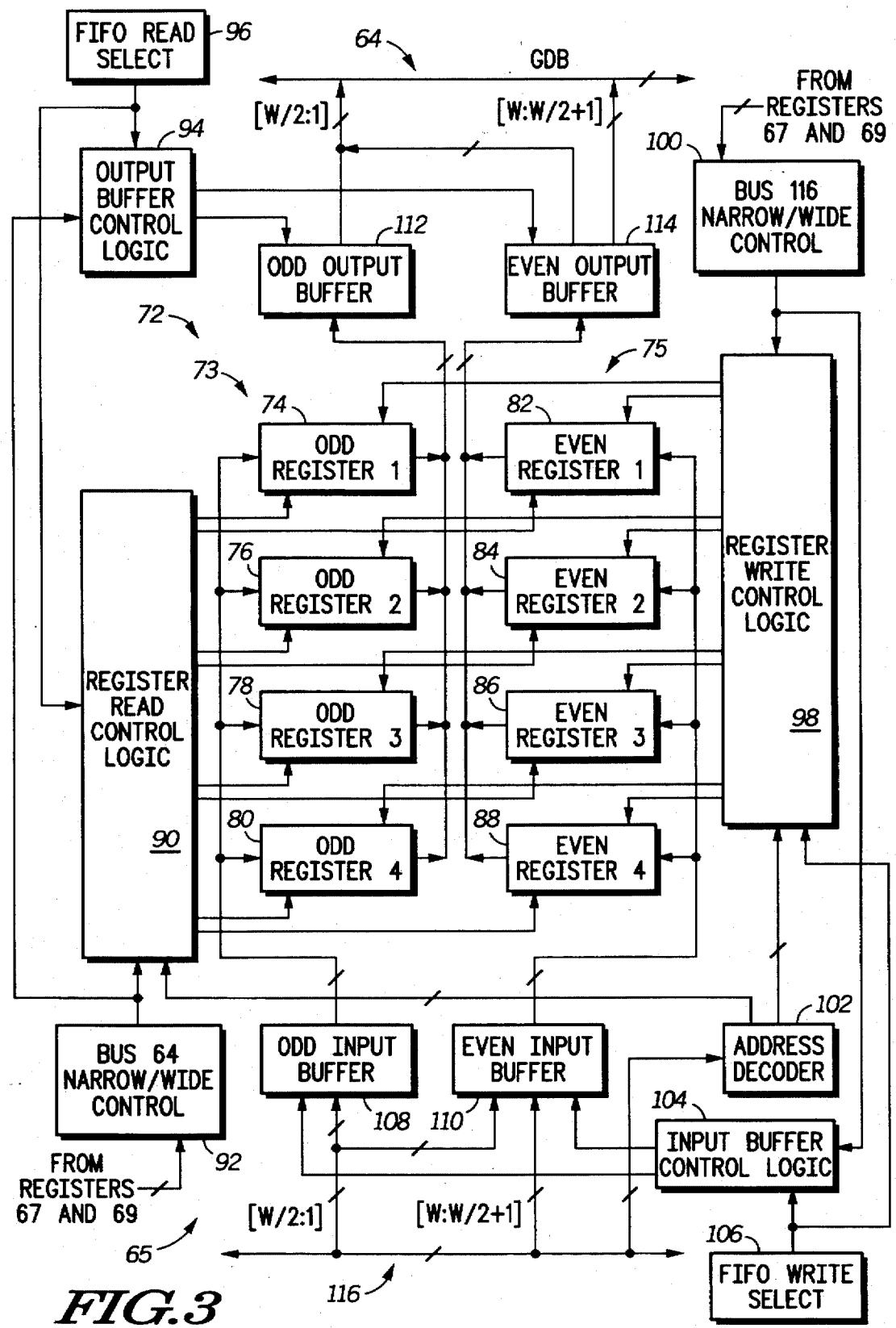
FIG. 3 illustrates in block diagram form, an adjustable depth/width FIFO buffer of a host interface of FIG. 2 in accordance with an embodiment of the present invention.

FIG. 3 illustrates in block diagram form, adjustable depth/width FIFO buffer 65 of host interface 24 in accordance with one embodiment of the present invention. FIFO buffer 65 includes FIFO registers 72, register read control logic 90, bus 64 narrow/wide control 92, output buffer control logic 94, FIFO read select 96, register write control logic 98, bus 116 narrow/wide control 100, address decoder 102, input buffer control logic 104, FIFO write select 106, ODD input buffer 108, EVEN input buffer 110, ODD output buffer 112, and EVEN output buffer 114. Bus 116 is a bi-directional bus connected to input buffers 108 and 110. Bus 64 is a bi-directional bus connected to output buffers 112 and 114. FIFO registers 72 includes register section 73 and register section 75. Register section 73 includes ODD registers 74, 76, 78, and 80. Register section 75 includes EVEN registers 82, 84, 86, and 88.

In a preferred embodiment, FIFO buffer 65 comprises a portion of host interface 24 of FIG. 1. Also, FIFO buffer 66 may have circuitry similar to FIFO buffer 65. Data is provided to FIFO buffer 65 from bus 116. Bus 116 is an external bus that may be part of a host processor (not shown). Bus 64 is a bus internal to host interface 24 (FIG. 2). In other embodiments, buses 116 and 64 may be any two buses between which buffering is required. Buffering may be required, for example, because the two buses are controlled by different clocks.

Buses 116 and 64 transfer data words having W bits, where W is an integer. ODD input buffer 108 has a plurality of input terminals coupled to bus 116 for receiving data bits [W/2:1], a plurality of output terminals coupled to input terminals of each of ODD registers 74, 76, 78, and 80, and a control terminal for receiving a control signal from input buffer control logic 104. EVEN input buffer 110 has a plurality of input terminals coupled to bus 116 for receiving data bits [W:W/2+1], a plurality of output terminals coupled to a plurality of input terminals of each of EVEN registers 82, 84, 86, and 88, and a control terminal for receiving a control signal from input buffer control logic 104. ODD output buffer 112 has a plurality of input terminals coupled to a plurality of output terminals of ODD registers 74, 76, 78, and 80, a plurality of output terminals coupled to bus 64 for providing data bits [W/2:1], and a control terminal coupled to an output terminal of output buffer control logic 94 for receiving a control signal. EVEN output buffer 114 has a plurality of input terminals coupled to a plurality of output terminals of each of EVEN registers 82, 84, 86, and 88, a plurality of output terminals coupled to bus 64 for providing data bits [W:W/2+1], and a control terminal coupled to an output terminal of output buffer control logic 94.

FIFO read select 96 has an output terminal coupled to an input terminal of output buffer control logic 94. The output terminal of FIFO read select 96 is also coupled to an input terminal of register read control logic 90. Register read control logic 90 has an output terminal coupled to an input terminal of each of ODD registers 74, 76, 78, and 80, and EVEN registers 82, 84, 86, and 88 for providing a read control signal. In a preferred embodiment, each of ODD registers 74, 76, 78, and 80 and EVEN registers 82, 84, 86, and 88 are conventional 16 bit read/write registers. Register read control logic 90 and register write control logic 98 monitor FIFO registers 72 to track whether FIFO registers 72 are empty or full.

Bus 64 narrow/wide control 92 has a plurality of input terminals coupled to registers 67 and 69 of FIG. 2, and an output terminal coupled to input terminals of both output buffer control logic 94 and register read control logic 90. Register write control logic 98 has an output terminal coupled to an input terminal of each of ODD registers 74, 76, 78, and 80, and EVEN registers 82, 84, 86, and 88 for providing a write control signal. Address decoder 102 has a plurality of input terminals coupled to bus 116 for receiving a plurality of address signals, and a plurality of output terminals coupled to register write control logic 98.

FIFO write select 106 has an output terminal coupled to an input terminal of input buffer control logic 104 and to an input terminal of register write control logic 98. FIFO write select 106 provides an enable signal to input buffer control logic 104 and to register write control logic 98 when the host processor writes data to FIFO buffer 65. Bus 116 narrow/wide control 100 has a plurality of input terminals coupled to registers 67 and 69, and an output terminal coupled to an input terminal of register write control logic 98 and to an input terminal of input buffer control logic 104. Input buffer control logic 104 has a first output terminal connected to an input terminal of ODD input buffer 108, and a second output terminal connected to an input terminal of EVEN input buffer 110.

Data is written to FIFO buffer 65 from bus 116, and data is read from FIFO buffer 65 to bus 64. FIFO registers 72 are divided into two sections, sections 73 and 75. Section 75 is an "even" section comprising EVEN registers 82, 84, 86, and 88, and section 73 is an "odd" section comprising ODD registers 74, 76, 78, and 80. In other embodiments, there can be any number of sections depending on how many different data widths are to be accommodated. Each section can be written to and read from separately. Buses 116 and 64 both have dynamic sizing, where words of various sizes can be transmitted on the same bus. In the illustrated embodiment, FIFO buffer 65 can receive data having a word width (W) up to 32 bits wide, and FIFO buffer 65 has a depth (D) that is variable depending on the width (W) of the word.

For the illustrated embodiment of FIFO buffer 65, there are four possibilities for transferring data: 1) FIFO buffer 65 can receive 16 bit words from bus 116 and provided 16 bit words to bus 64; 2) FIFO buffer 65 can receive 16 bit words from bus 116 and provide 32 bit words to bus 64; 3) FIFO buffer 65 can receive 32 bit words from bus 116 and provide 16 bit words to bus 64; and 4) FIFO buffer 65 can receive 32 bit words from bus 116 and provide 32 bit words to bus 64. If 16 bit words are transferred, FIFO registers 72 are 8 words deep. If 32 bit words are transferred, FIFO registers 72 are 4 words deep. For the following examples of data transfers through FIFO buffer 65, W is equal to 32. However, W may be equal to other data widths in other embodiments.

When writing 16 bit words from bus 116 to FIFO buffer 65 and reading 16 bit words to bus 64, both bus 116 and bus 64 "see" a narrow 16 bit wide FIFO buffer. Bus 116 narrow/wide control 100 defines bus 116 as narrow, i.e. W/2 bits wide. Bus 64 narrow/wide control 92 defines bus 64 as narrow, i.e. W/2 bits wide. FIFO write select 106 provides a control signal to register write control logic 98 and to input buffer control logic 104 to prepare FIFO buffer 65 for sampling data from bus 116. Input data from bus 116 is sampled from bits [W/2:1] to ODD input buffer 108 or to EVEN input buffer 110. From ODD input buffer 108, the first 16 bit data word is written to one of ODD registers 74, 76, 78, and 80 from [W/2:1] as determined by an address received from bus 116 by address decoder 102. Address decoder 102 provides a decoded address to register read control logic 90. Register read control logic 90 selects one of ODD registers 74, 76, 78, or 80 to be written to. The second 16 bit data word is written to one of EVEN registers 82, 84, 86, and 88 by way of EVEN input buffer 110 from bits [W/2:1]. The third 16 bit data word is written to one of ODD registers 74, 76, 78, and 80 from bits [W/2:1]. The transfer continues until complete, or FIFO buffer 65 is full, by alternating between the even and odd registers.

When reading a sixteen bit data word from FIFO buffer 65, sixteen bit data words are output from one of ODD registers 74, 76, 78, and 80, or from EVEN registers 82, 84, 86, and 88. The first 16 bit word is read from one of ODD registers 74, 76, 78, and 80 through ODD output buffer 112 to output bits [W/2:1]. The second 16 bit word is read from one of EVEN registers 82, 84, 86, and 88 through EVEN output buffer 114 to output bits [W/2:1]. The third 16 bit word is read from one of ODD registers 74, 76, 78, and 80 through ODD output buffer 112 to output bits [W/2:1]. This continues until the transfer is complete or FIFO buffer 65 is empty. In the illustrated embodiment, each of the ODD registers and the EVEN registers are 16 bits wide. In other embodiments, the registers can be any width.

When writing a 16 bit word from bus 116 to FIFO buffer 65 and reading 32 bit words to bus 64, bus 116 perceives FIFO buffer 65 as having a depth of 8 words and bus 64 perceives FIFO buffer 65 as having a depth of 4 words. Bus 116 narrow/wide control 100 defines bus 116 as narrow, that is, W/2 bits wide. Bus 64 narrow/wide control 92 defines bus 64 as wide, that is, W bits wide. FIFO write select 106 provides a control signal to register write control logic 98 and to input buffer control logic 104 to prepare FIFO buffer 65 for sampling data from bus 116. Input data from bus 116 is sampled from bits [W/2:1] to ODD input buffer 108 or to EVEN input buffer 110. Data is not sampled from the [W:W/2+1] bits. In a preferred embodiment, W is equal to 32. From ODD input buffer 108, the first 16 bit data word is written to one of ODD registers 74, 76, 78, and 80 from [W/2:1] as determined by an address received from bus 116 by address decoder 102. Address decoder 102 provides a decoded address to register read control logic 90. Register read control logic 90 selects one of ODD registers 74, 76, 78, or 80 to be written to. The second 16 bit data word is written to one of EVEN registers 82, 84, 86, and 88 by way of EVEN input buffer 110 from [W/2:1]. The third 16 bit data word is written to one of ODD registers 74, 76, 78, and 80 from [W/2:1]. The transfer continues until complete, or FIFO buffer 65 is full, by alternating between the even and odd registers.

A 32 bit data word is read to bus 64 from one ODD registers 74, 76, 78, and 80 and one EVEN registers 82, 84, 86, and 88 at the same time. Sixteen bits of the 32 bit data word are read from ODD registers 74, 76, 78, and 80 through ODD output buffer 112 to output bits [W/2:1]. The other 16 bits are read from one of EVEN registers 82, 84, 86, and 88 through EVEN output buffer 114 to bits [W: W/2+1]. Address decoder 102 provides the decoded address to register read control logic 90 to select which ODD and EVEN registers are read from. This continues until the transfer is complete or FIFO buffer 65 is empty.

When sampling a 32 bit word from bus 116 to FIFO buffer 65 and reading a 16 bit word to bus 64, bus 116 perceives FIFO buffer 65 as having a depth of 4 words and bus 64 perceives FIFO buffer 65 as having a depth of 8 words. Bus 116 narrow/wide control 100 defines bus 116 as wide, that is, W bits wide, and provides a control signal to prepare register write control logic 98 and input buffer control logic 104 to receive 32 bit words. Bus 64 narrow/wide control 92 defines bus 64 as narrow, that is, W/2 bits wide, and prepares register read control logic 90 and output buffer control logic 94 to write 32 bit words. FIFO write select 106 provides an enable signal to register write control logic 98 and to input buffer control logic 104 to cause FIFO buffer 65 to sample data from bus 116. Address decoder 102 provides a decoded address to register write control logic 98. Register write control logic 98 selects one of ODD registers 74, 76, 78, or 80 to be written to. Sixteen bits of the 32 bit data words are sampled from bits [W/2:1] of bus 116 to ODD input buffer 108, while simultaneously, the other 16 bits are sampled to EVEN input buffer 110 from bits [W:W/2+1].

When reading 16 bit data words to bus 64, the first word to be read, [W/2:1], is from one of ODD registers 74, 76, 78, and 80 to ODD output buffer 112. The second 16 bit word [W:W/2+1] is from one of EVEN registers 82, 84, 86, and 88 to EVEN output buffer 114. The third 16 bit word is from one of ODD registers 74, 76, 78, or 80, and so on until the transfer is complete or FIFO buffer 65 is empty. Address decoder 102 provides the decoded address to register read control logic 90 to select which ODD and EVEN registers are to be read.

When sampling a 32 bit word from bus 116 to FIFO buffer 65 and reading a 32 bit word to bus 64, buses 116 and 64 perceive FIFO buffer 65 as having a depth of 4 words. Bus 116 narrow/wide control 100 defines bus 116 as wide, that is, W bits wide, and provides a control signal to prepare register write control logic 98 and input buffer control logic 102 to receive 32 bit words. Bus 64 narrow/wide control 92 also defines bus 64 as wide, and prepares register read control logic 90 and output buffer control logic 94 to write 32 bit words. FIFO write select 106 provides an enable signal to register write control logic 98 and to input buffer control logic 104 to cause FIFO buffer 65 to sample 32 bit words of data from bus 116. Address decoder 102 provides a decoded address to register write control logic 98. Register write control logic 98 selects one of ODD registers 74, 76, 78, or 80 to receives 16 bits from [W/2:1], while simultaneously, the other 16 bits are sampled to EVEN input buffer 110 from bits [W:W/2+1].

A 32 bit data word is read to bus 64 from one ODD registers 74, 76, 78, and 80 and one EVEN registers 82, 84, 86, and 88 at the same time. Sixteen bits of the 32 bit data word are read from ODD registers 74, 76, 78, and 80 through ODD output buffer 112 to output bits [W/2:1]. The other 16 bits are read from one of EVEN registers 82, 84, 86, and 88 through EVEN output buffer 114 to bits [W: W/2+1]. Address decoder 102 provides the decoded address to register read control logic 90 to select which ODD and EVEN registers are read from in response to an enable signal from FIFO read select 96. This continues until the transfer is complete or FIFO buffer 65 is empty.

By dividing the FIFO registers into sections, and controlling the sections independently, data words of variable width can be transferred without wasting storage area in the FIFO buffer. Since the buffer storage area is more efficiently used, surface area on the integrated circuit is more efficiently used.

FIG. 4 illustrates in block diagram form, DSP control register 69 of host interface 24 of FIG. 2. DSP control register 69 includes 32 control bits. Control bits 130 and 131, labeled "FC1" and "FC0" control data transfer formats in host transmit data FIFO buffer 65 and in DSP transmit data FIFO buffer 66 when host interface 24 is transmitting data as bus master. Control bits 130 and 131 define the width of data in the FIFO buffers, data alignment in FIFO registers 72, and sign extension when host interface 24 is reading to or writing from bus 116. Control bits 132, labeled "BL5-BL0", control the data burst length. The value in control bits 132 is decremented after each data transfer cycle in which data is transferred. When the value in control bits 132 reaches zero, or another predetermined value, the transfer is terminated.

FIG. 5 illustrates in block diagram form, host interface control register 67 of host interface 24 of FIG. 2. Host interface control register 67 includes control bits 136–142. Host receive data transfer format control bits 136 and 137, labeled "HRF1" and "HRF0", respectively, define data transfer formats for data transfers through DSP transmit data FIFO buffer 66 when host interface 24 is being read by a host processor. Control bits 136 and 137 define the width of data in the FIFO buffers, data alignment in the FIFO registers, and sign extension. Host transmit data transfer format control bits 138 and 139, labeled "HTF1" and "HTF0", respectively, define data transfer formats for transfers using host transmit data FIFO buffer 65 when host interface 24 is being written by a host processor. Control bits 138 and 139 define the width of data in the FIFO buffers, data alignment in the FIFO registers, and sign extension. Control bits 140, 141, and 142, labeled "HF2", "HF1", and "HF0", are general purpose host flags for communications between bus 116 and bus 64. Control bits 140, 141, and 142 may be asserted or negated by a host processor (not shown).

FIG. 6 illustrates in block diagram form, DSP status register 68 of host interface 24 of FIG. 2. DSP status register 68 includes bits 145–151. Bit 145, labeled "HACT", is asserted whenever host interface 24 is active. When a transfer is complete and activity has ceased in host interface 24, bit 145 is negated. Bits 146, 147, and 148, labeled "HF2", "HF1", and "HF0", indicate the state of host flags HF2, HF1, and HF0 in host interface control register 67. Only the host interface can change bits 146, 147, and 148. Bit 149, labeled "SRRQ", indicates that host transmit data FIFO buffer 65 contains data for data processing system 20. Bit 149 is negated when registers in host interface data FIFO buffer 65 are emptied by data processing system 20. When asserted, bit 150, labeled "STRQ", indicates that the registers in DSP transmit data FIFO buffer 66 are not full, and can be written to by data processing system 20. Bit 151, labeled "HCP", when asserted, indicates that a host command interrupt is pending. When the interrupt has been serviced by host interface 24, bit 151 is negated. Bit 151 can be negated by either host interface 24, or by the host processor (not shown).

Figure 7:
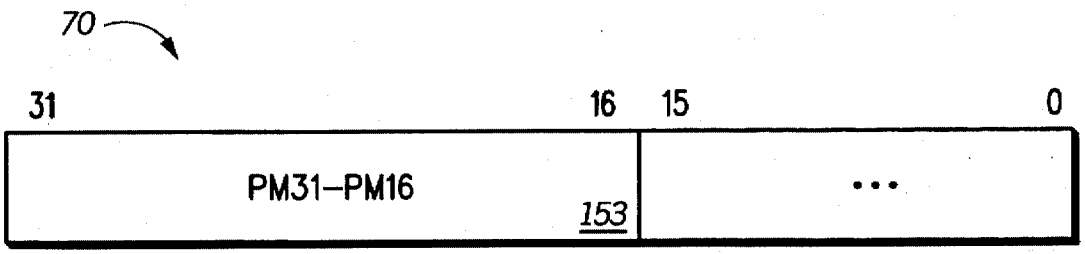
FIG. 7 illustrates in block diagram form, an address configuration register of the host interface of FIG. 2.
Figure 8:
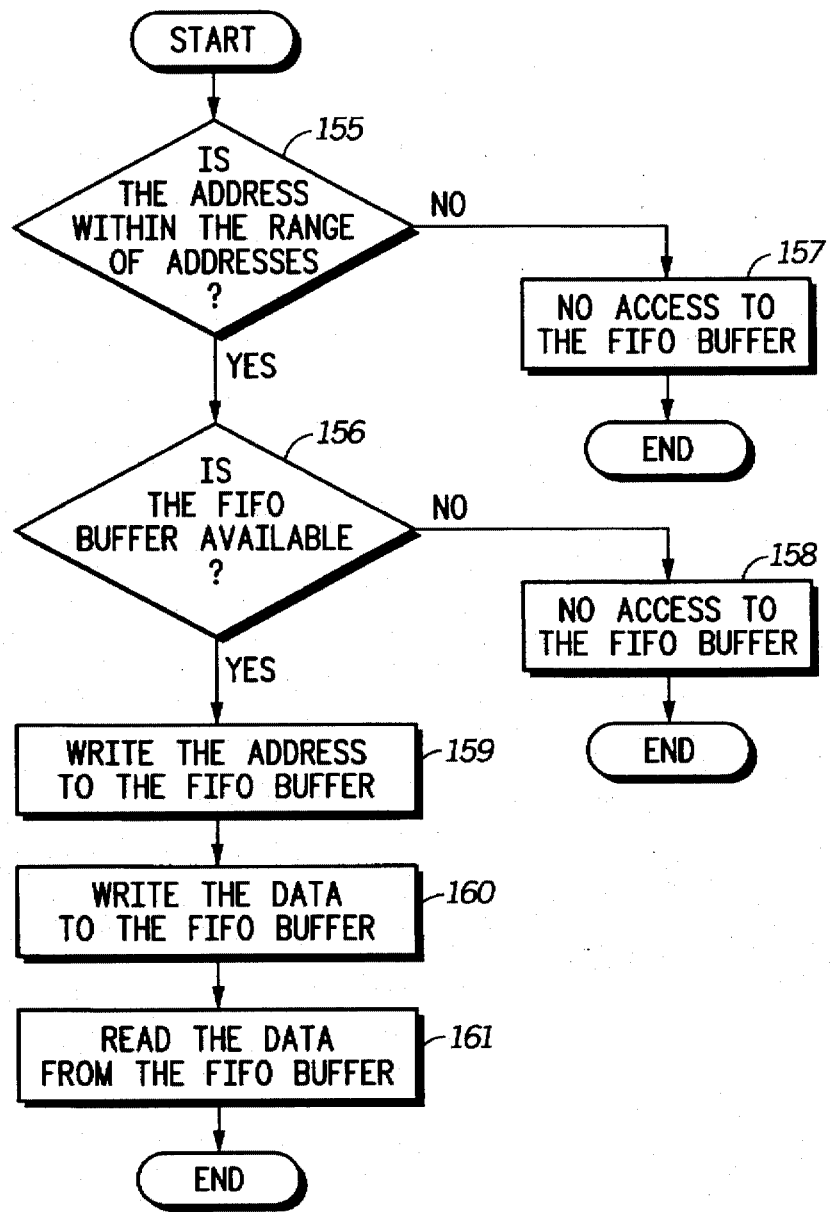
FIG. 8 illustrates in flow chart form, an address being inserted in the data stream in accordance with the present invention.

FIG. 7 illustrates in block diagram form, address configuration register 70 of host interface 24 of FIG. 2. Address bits 153, labeled "PM31–PM16" define the range of addresses for accessing FIFO buffer 65. Depending on the operating mode of host interface 24, address configuration register 70 may be accessed by a host processor, or may be indirectly accessed by host interface 24.

FIG. 8 illustrates in flow chart form, the steps required to insert an address into a data stream of FIFO buffer 65 in accordance with an embodiment of the present invention. Diamond-shaped boxes 155 and 156 represent decision steps, and rectangular boxes 157–161 represent steps which are performed in order to insert an address into the data stream. FIFO buffer 65 can be accessed via bus 116 using a range of addresses. The range of addresses is defined by the most significant bits of an address sampled from bus 116. For example, if the 16 most significant bits of a 32 bit address are used to identify an access to FIFO buffer 65, FIFO buffer 65 can be accessed at $2^{16}$, or 65536 locations. The least significant bits are "almost" don't care, as 7 of the 65536 locations are registers other than FIFO buffer 65. The output of FIFO buffer 65 can be transferred to a range of addresses by any of several mechanisms. For example, the lower order address bits can be used as a pointer to direct where to store the data coming through FIFO buffer 65.

When transferring a data stream through a FIFO buffer, the address used to access the FIFO buffer can be lost unless some provision is made for retaining the address. In FIFO buffer 65, the first data sampled from bus 116 is the address. The address may also contain header information. Header information in the address may be used to direct the data to the desired location in data processing system 20, or describe how the data processing system is to use the address. In the illustrated embodiment, bus 116 is a "multiplexed bus"0 for carrying both address and data information. The described method of address insertion requires that the system component reading the data, such as for example, address generation unit/DMA controller 36, identify the address as such when it is read from FIFO buffer 65. There are several ways of distinguishing the address from the data in a multiplexed bus. For example, if the FIFO buffer is empty when the transaction begins, the address is the first data read from the FIFO buffer. Also, if the data burst is of a known length, the next word to be read from the FIFO buffer is an address. In addition, the length of the data stream could be a function of the address, where the next word to be read after a data stream is an address.

When address information is sampled from bus 116, address decoder 102 provides a write enable signal to register write control logic 98. The address is then written as the first data sampled from bus 116, since the address is on bus 116 when the write enable signal is provided. After the address is received, data is sampled from bus 116. The size of the data stream is controlled by the host processor when host interface 24 is the slave. When host interface 24 is a master, the size of the data stream is determined by an initial value in bits 132 of DSP control register 69 (FIG. 4). The value in bits 132 is decremented each time a data word is transferred. When the value equals zero, the transfer is complete.

At decision step 155, the host processor determines if the address is within the range required for an access to FIFO buffer 65. If the address is not within the required range, the "no" path is taken, and at step 157, access is denied to FIFO buffer 65. If the address is within the required range, the "yes" path is taken to decision step 156. At step 156, the host processor determines if the FIFO buffer is available by checking bit 145 in DSP status register 68 (FIG. 6). If the FIFO buffer is not available, the "no" path is taken to step 158, and access to FIFO buffer 65 is denied. The host processor must wait until FIFO buffer 65 has completed the present transaction before access is granted. If the FIFO buffer is available, the "yes" path is taken to step 159, and the address is sampled by host interface 24 to FIFO buffer 65. Note that the transaction is described with a transaction from bus 116 to bus 64 via FIFO buffer 65. However, in other embodiments, the transaction could also be from bus 64 to bus 116 via DSP transmit data FIFO buffer 66 using similar steps. After the address is written to a register of FIFO buffer 65, at step 160, a burst of data is written to FIFO buffer 65. Once data words are written to FIFO buffer 65, that is, when FIFO buffer 65 is not empty, at step 161, data words are read from FIFO buffer 65 to a storage location in data processing system 20. A data stream may be read from FIFO buffer 65 at the same time the data stream is being written to FIFO buffer 65. The FIFO buffer always remains partially empty. If FIFO buffer 65 is filled up during a transaction, wait states can be inserted by host interface 24 to prevent the host processor from overwriting FIFO buffer 65.

Bus 116 is shown as a multiplexed bus, meaning that the bus carries both address and data information. However, in another embodiment, bus 116 may be divided into separate address and data buses, such as in an ISA bus. Note also that in the embodiment described in FIG. 7, FIFO buffer 65 is used in host interface 24, however, in other embodiments, a conventional FIFO buffer having fixed depth and width could be used.

By using a small FIFO buffer instead of a larger memory array, space is saved in data processing system 20. Having a FIFO buffer with variable width and depth allows more efficient use of the storage area of the FIFO buffer when transferring data from one size bus to another bus having a different size. To prevent the address of a data burst through the FIFO buffer from being lost, the address is inserted at the beginning of the data stream.

While the invention has been described in the context of a preferred embodiment, it will be apparent to those skilled in the art that the present invention may be modified in numerous ways and may assume many embodiments other than that specifically set out and described above. For example, FIFO buffer 65 is illustrated with two sections of FIFO registers 72 for providing a FIFO buffer having two data widths. However, in other embodiments, FIFO buffer 65 may be adapted to have three or more sections for providing a FIFO buffer with three or more data widths. Accordingly, it is intended by the appended claims to cover all modifications of the invention which fall within the true spirit and scope of the invention.

What is claimed is:

1. A data processing system having a first-in, first-out buffer, the first-in, first-out buffer comprising:

a plurality of storage elements, the plurality of storage elements organized as a first section and a second section, each storage element of the plurality of storage elements having a plurality of input terminals coupled to a first bus, and a plurality of output terminals coupled to a second bus; and a control logic circuit, coupled to the plurality of storage elements, for controlling access to the first section and to the second section;

wherein the plurality of storage elements have a first width and a first depth in response to the control logic circuit independently accessing the first and second sections, and the plurality of storage elements have a second width and a second depth in response to the control logic circuit accessing the first and second sections together, and wherein one of either the first depth and the second depth is provided depending which of the first width or second width is used.

2. A data processing system as in claim 1, wherein the first depth is equal to one-half of the second depth, and the first width is equal to one-half of the second width.

3. A data processing system as in claim 1, wherein the plurality of storage elements are characterized as being a plurality of read/write registers.

4. A data processing system as in claim 1, wherein the first bus and the second bus are both characterized as being dynamic buses.

5. A data processing system as in claim 1, wherein the first-in, first-out buffer is in a data processing system, and the first bus is characterized as being external to the data processing system, and the second bus is characterized as being internal to the data processing system.

6. A data processing system as in claim 1, wherein the first width is equal to 16 bits and the first depth is equal to eight words, and the second width is equal to 32 bits and the second depth is equal to 4 words.

7. A data processing system having an adjustable depth/width first-in, first-out buffer, the adjustable depth/width first-in, first-out buffer comprising:

a first section of storage elements, each storage element of the first section of storage elements for storing a first predetermined number of data bits, the first section of storage elements coupled to a bus;

a second section of storage elements each storage element of the second section of storage elements for storing a second predetermined number of data bits, the second section of storage elements coupled to the bus; and a control logic circuit, coupled to the first and second sections of storage elements, the control logic circuit accessing one storage element of the first section of storage elements in response to sampling a first data word from the bus having the first predetermined number of data bits, and the control logic circuit accessing one storage element of both the first and second sections of storage elements together in parallel for storing a second data word from the bus having a third predetermined number of data bits, wherein the third predetermined number of data bits is equal to the first predetermined number plus the second predetermined number, the control logic circuit accessing the first and second sections of storage elements to provide a first depth when sampling the first data word from the bus having the first predetermined number of data bits and the control logic circuit accessing the first and second sections of storage elements to provide a second depth when sampling the second data word from the bus having the third predetermined number of data bits, wherein the first depth is substantially twice the second depth.

8. A data processing system as in claim 7, wherein the first and second sections of storage elements comprise first and second sections of read/write registers.

9. A data processing system as in claim 7, wherein the first predetermined number is equal to the second predetermined number.

10. A data processing system as in claim 7, wherein the first-in, first-out buffer is part of a host interface unit.

* * * * *